(12) United States Patent
Seo et al.

(10) Patent No.: US 9,665,782 B2
(45) Date of Patent: May 30, 2017

(54) OBSTACLE DETECTING APPARATUS AND OBSTACLE DETECTING METHOD

(71) Applicant: HYUNDAI MOBIS Co., Ltd., Yongin-si (KR)

(72) Inventors: Sung Jin Seo, Yongin-si (KR); Jong Hwan Kim, Yongin-si (KR); Joon Bum Cho, Yongin-si (KR)

(73) Assignee: HYUNDAI MOBIS CO., LTD., Yongin-Si (KR)

( * ) Notice: Subject to any disclaimer, the term of this patent is extended or adjusted under 35 U.S.C. 154(b) by 0 days.

(21) Appl. No.: 14/963,452

(22) Filed: Dec. 9, 2015

(65) Prior Publication Data

US 2016/0180181 A1 Jun. 23, 2016

(30) Foreign Application Priority Data

Dec. 22, 2014 (KR) .......................... 10-2014-0186267

(51) Int. Cl.
*G06K 9/00* (2006.01)
*H04N 13/00* (2006.01)
(Continued)

(52) U.S. Cl.
CPC ......... *G06K 9/00805* (2013.01); *G06K 9/469* (2013.01); *G06T 7/0075* (2013.01);
(Continued)

(58) Field of Classification Search
CPC ....... G06K 2009/4666; G06K 9/00805; G06K 9/469; G06T 2207/10012;
(Continued)

(56) References Cited

U.S. PATENT DOCUMENTS 8,630,806 B1 * 1/2014 Zhu ....................... B60W 30/16
701/408
2001/0048763 A1 12/2001 Takatsuka et al.
(Continued)

FOREIGN PATENT DOCUMENTS

DE          60130517 T2    6/2008
JP          2004-094707    3/2004
(Continued)

OTHER PUBLICATIONS

Korean Intellectual Property Office, Notice of Allowance for Korean patent application No. 10-2014-0186267, Sep. 26, 2016, Korea.
(Continued)

*Primary Examiner* — Tom Y Lu
(74) *Attorney, Agent, or Firm* — Mayer Brown LLP; Hyunho Park (57) ABSTRACT

The present invention relates to an obstacle detecting apparatus and an obstacle detecting method and an exemplary embodiment of the present invention provides an obstacle detecting apparatus, including: a stereo camera which photographs a front of a vehicle to generate a left image and a right image; an image matching unit which applies a block matching algorithm to the left image and the right image to extract a plurality of feature points having a similarity which is equal to or larger than a reference value and calculate a coordinate and a depth of the plurality of extracted feature points; a plane calculating unit which connects every three feature points of the plurality of feature points to calculate a plurality of triangles, based on the coordinate and the depth of the plurality of feature points; a normal calculating unit which calculates directions of normal of the plurality of triangles, based on the coordinate and the depth of three feature points corresponding to vertexes of the plurality of triangles; and an obstacle detecting unit which detects an
(Continued)

obstacle in front of the vehicle based on a result of comparing a photographing direction of the stereo camera with the normal directions of the plurality of triangles.

15 Claims, 4 Drawing Sheets (51) Int. Cl.
*G06T 7/00* (2017.01)
*G06T 7/593* (2017.01)
*G06K 9/46* (2006.01)

(52) U.S. Cl.
CPC ............ *G06T 7/593* (2017.01); *H04N 13/00* (2013.01); *H04N 13/0022* (2013.01); *G06K 2009/4666* (2013.01); *G06T 2207/10012* (2013.01); *G06T 2207/20021* (2013.01); *G06T 2207/30261* (2013.01); *H04N 2013/0081* (2013.01)

(58) Field of Classification Search
CPC . G06T 2207/20021; G06T 2207/30261; G06T 7/0075; G06T 2200/04; G06T 2207/30256; G06T 7/0085; G06T 7/60; H04N 13/00; H04N 13/0022; H04N 2013/0081; B60R 1/00
See application file for complete search history.

(56) References Cited

U.S. PATENT DOCUMENTS

| | | | | |
|---|---|---|---|---|
| 2004/0264763 | A1* | 12/2004 | Mas | G01C 23/00 382/154 |
| 2006/0029272 | A1* | 2/2006 | Ogawa | G06K 9/32 382/154 |
| 2009/0304263 | A1 | 12/2009 | Engelberg et al. | |
| 2011/0216213 | A1 | 9/2011 | Kawahata | |
| 2011/0299761 | A1 | 12/2011 | Myokan | |
| 2012/0314037 | A1* | 12/2012 | Nehmadi | G01C 11/06 348/48 |
| 2014/0225990 | A1* | 8/2014 | Einecke | G06T 5/006 348/47 |
| 2015/0228079 | A1* | 8/2015 | Murarka | G06T 7/0075 345/419 |
| 2016/0014406 | A1* | 1/2016 | Takahashi | H04N 7/188 348/148 |

FOREIGN PATENT DOCUMENTS

| | | |
|---|---|---|
| JP | 2009-139323 A | 6/2009 |
| JP | 2011-186749 A | 9/2011 |
| JP | 2011-253376 A | 12/2011 |
| JP | 2012-196997 A | 10/2012 |
| JP | 2014-228941 A | 12/2014 |
| KR | 10-2008-0022748 A | 3/2008 |
| WO | 2005081176 A1 | 9/2005 |
| WO | 2009/028489 A1 | 3/2009 |

OTHER PUBLICATIONS

Korean Intellectual Property Office, Office Action for Korean patent application No. 10-2014-0186267, May 16, 2016, Korea.
Obstacle Detection from Monocular On-Vehicle Camera in units of Delaunay Triangles, SIG Technical Reports, Feb. 22, 2013, Journal of Information Processing, http://ipsj.ixsq.nii.ac.jp/ej/?action=pages.
Japanese Patent Office, Office Action for Japanese Patent Application No. 2015-241088, dated Dec. 6, 2016, Japan.
German Patent Office, Office Action for German Patent Application No. 10 2015 121 387.7, dated Jan. 12, 2017, Germany.

* cited by examiner

OBSTACLE DETECTING APPARATUS AND OBSTACLE DETECTING METHOD

CROSS-REFERENCE TO RELATED APPLICATIONS

The present application claims priority to Korean Patent Application Number 10-2014-0186267 filed Dec. 22, 2014, the entire contents of which application is incorporated herein for all purposes by this reference.

TECHNICAL FIELD

The present invention relates to an obstacle detecting apparatus, and more particularly, to an obstacle detecting apparatus and an obstacle detecting method which set a feature point in a vehicle front image which is output by a stereo camera to calculate a plane of the same space and add adjacent planes by calculating a normal, and detect an obstacle in a normal direction.

BACKGROUND

Recently, a technology which detects an object in front of a vehicle to control the vehicle in accordance with the object is applied to lots of vehicles. Specifically, a technology which detects an object near the vehicle using a stereo camera has gradually increased in use.

However, an object detecting device using a stereo camera of the related art has a problem of processing an image near a vehicle which needs to be processed in real time, due to a complex algorithm. A technology of detecting an object near the vehicle is directly connected to a safety of a driver, a pedestrian, and a driver of another vehicle. Recently, a technology which rapidly processes an image which is photographed in a vehicle to detect an obstacle near the vehicle is being studied.

SUMMARY

The present invention has been made in an effort to provide an obstacle detecting apparatus which detects a feature point from a vehicle front image which is generated by a stereo camera and detects an obstacle in front of the vehicle based on a normal direction of a triangle formed by connecting the detected feature points.

Objects of the present invention are not limited to the above-mentioned objects, and other objects, which are not mentioned above, can be clearly understood by those skilled in the art from the following descriptions.

An exemplary embodiment of the present invention provides an obstacle detecting apparatus, including: a stereo camera which photographs a front of a vehicle to generate a left image and a right image; an image matching unit which applies a block matching algorithm to the left image and the right image to extract a plurality of feature points having a similarity which is equal to or larger than a reference value and calculate a coordinate and a depth of the plurality of extracted feature points; a plane calculating unit which connects every three feature points of the plurality of feature points to calculate a plurality of triangles, based on the coordinate and the depth of the plurality of feature points; a normal calculating unit which calculates directions of normal of the plurality of triangles, based on the coordinate and the depth of three feature points corresponding to vertexes of the plurality of triangles; and an obstacle detecting unit which detects an obstacle in front of the vehicle based on a result of comparing a photographing direction of the stereo camera with the normal directions of the plurality of triangles.

The image matching unit may calculate a region where brightness change is equal to or larger than a predetermined value, in the left image and the right image, using the edge detection, and the block matching algorithm may be applied to the region where the brightness change is equal to or larger than the predetermined value to extract the plurality of feature points.

The plane calculating unit may calculate the plurality of triangles using Delaunay triangulation.

The normal calculating unit may calculate a direction of a normal which passes through a center of gravity of the plurality of triangles.

When a difference of directions of the normal of two triangles, which share one corner, among the plurality of triangles, is smaller than a predetermined first threshold value, the normal calculating unit may set normal directions of two triangles to have the same value.

When, among the plurality of triangles, the first triangle and the second triangle share one corner and a difference between a first direction which is a normal direction of a first triangle and a second direction which is a normal direction of a second triangle is smaller than a predetermined first threshold value, the normal calculating unit may set the normal of the first triangle and the second triangle to have any one of the first direction, the second direction, and an intermediate direction of the first direction and the second direction.

The obstacle detecting unit may detect a triangle which has a normal direction which has a difference from the photographing direction of the stereo camera which is smaller than the predetermined second threshold value, as an obstacle, among the plurality of triangles.

The obstacle detecting unit may determine a triangle which has a normal direction which has a difference from the photographing direction of the stereo camera which is equal to or larger than the predetermined second threshold value, as a road surface, among the plurality of triangles.

The apparatus may further include a warning unit which outputs information on the obstacle or a warning message, when an obstacle in front of the vehicle is detected by the obstacle detecting unit.

Another exemplary embodiment of the present invention provides, an obstacle detecting method, including: generating a left image and a right image with respect to a front of a vehicle, using a stereo camera; extracting a plurality of feature points having a similarity which is equal to or larger than a reference value, by applying block matching algorithm to the left image and the right image; calculating a coordinate and a depth of the plurality of extracted feature points; connecting every three feature points of the plurality of feature points to calculate a plurality of triangles, based on the coordinate and the depth of the plurality of feature points; calculating directions of normal of the plurality of triangles, based on the coordinate and the depth of three feature points corresponding to vertexes of the plurality of triangles; and detecting an obstacle in front of the vehicle based on a result of comparing a photographing direction of the stereo camera with the normal directions of the plurality of triangles.

The extracting of a plurality of feature points may include: calculating a region where brightness change is equal to or larger than a predetermined value, in the left image and the right image, using the edge detection; and applying the block matching algorithm to the region where the brightness change is equal to or larger than the predetermined value to extract the plurality of feature points.

In the calculating of normal directions of the plurality of triangles, when a difference of directions of the normal of two triangles, which share one corner, among the plurality of triangles, is smaller than a predetermined first threshold value, normal directions of two triangles are set to have the same value.

In the detecting of an obstacle in front of the vehicle, a triangle which has a normal direction which has a difference from the photographing direction of the stereo camera which is smaller than the predetermined second threshold value is detected as an obstacle, among the plurality of triangles.

The method may further include outputting information on the obstacle or a warning message when an obstacle in front of the vehicle is detected.

In the detecting of an obstacle, a triangle which has a normal direction which has a difference from the photographing direction of the stereo camera which is equal to or larger than the predetermined value is detected as a road surface, among the plurality of triangles.

Other detailed matters of the embodiments are included in the detailed description and the drawings.

According to the exemplary embodiment of the obstacle detecting apparatus, there are one or more advantages as follows.

First, only depths of feature points which are included in predetermined regions having high similarities rather than an entire region of a left image and a right image generated by a stereo camera are calculated, thereby reducing a computation amount required to detect the obstacle from the image.

Second, whether there is an obstacle is detected based on a normal direction of a triangle formed using three feature points as vertexes, so that a depth estimating process is omitted, thereby improving an obstacle detecting speed.

Third, an obstacle is detected from only a part of a left image and a right image which are generated by a stereo camera, so that even though a cheap component whose image processing speed is relatively slow is used, a predetermined level or higher of obstacle detecting performance may be secured.

The effects of the present invention are not limited to the aforementioned effects, and other effects, which are not mentioned above, will be apparently understood by a person skilled in the art from the recitations of the claims.

DETAILED DESCRIPTION

Advantages and characteristics of the present invention and a method of achieving the advantages and characteristics will be clear by referring to exemplary embodiments described below in detail together with the accompanying drawings. However, the present invention is not limited to exemplary embodiments disclosed herein but will be implemented in various different forms. The exemplary embodiments are provided by way of example only so that a person of ordinary skilled in the art can fully understand the disclosures of the present invention and the scope of the present invention. Therefore, the present invention will be defined only by the scope of the appended claims. Like reference numerals indicate like elements throughout the specification.

Herein, the present invention will be described with reference to the drawings for explaining an obstacle detecting apparatus according to an embodiment of the present invention.

Figure 1:
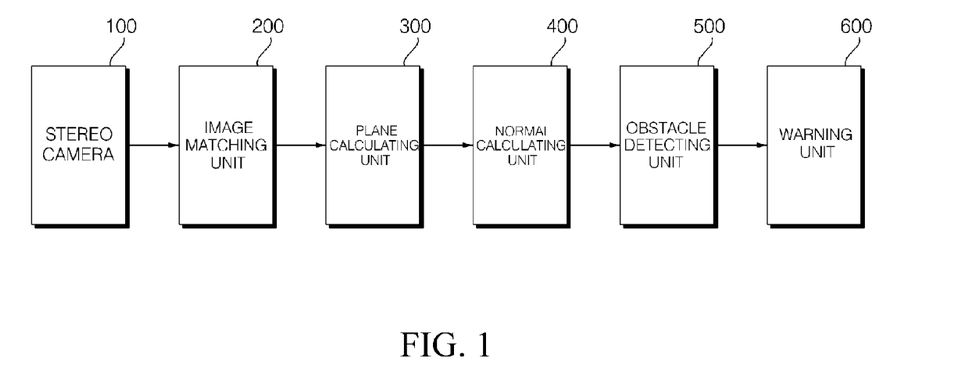
FIG. 1 is a diagram illustrating a configuration of an obstacle detecting apparatus according to an exemplary embodiment of the present invention.

FIG. 1 is a diagram illustrating a configuration of an obstacle detecting apparatus according to an exemplary embodiment of the present invention. An obstacle detecting apparatus according to an exemplary embodiment of the present invention includes a stereo camera 100, an image matching unit 200, a plane calculating unit 300, a normal calculating unit 400, and an obstacle detecting unit 500.

First, the stereo camera 100 photographs a front of the vehicle to generate a left image and a right image. Specifically, the stereo camera 100 is mounted in a position (for example, an upper side of a wind shield or a bonnet) of the vehicle to photograph a front of the vehicle corresponding to a predetermined photographing direction to generate a left image and a right image and output the generated left image and right image to the image matching unit 200. For example, the stereo camera 100 may generate the left image photographed through a left lens of the stereo camera 100 and the right image photographed through a right lens of the stereo camera 100. In this case, the photographing direction of the stereo camera 100 may be set in advance so as to be the same as a driving direction of the vehicle when the vehicle goes straight.

In this case, the left image and the right image may refer to images which are sequentially generated as time goes by. For example, a left image and a right image at a first point of time may be different from a left image and a right image at a second point of time.

The image matching unit 200 extracts a plurality of feature points included in the left image and the right image. In this case, the plurality of feature points may be three or more feature points so as to calculate at least one plane. Specifically, the image matching unit 200 applies a block matching algorithm to the left image and the right image to extract a plurality of feature points having a similarity which is equal to or larger than a reference value. Here, each feature point may correspond to one pixel. For example, the image matching unit 200 may extract pixels which are included in a block having a sum of absolute differences (SAD) or a sum of squared differences (SSD) which is smaller than a predetermined value, from the left image and the right image, as feature points. That is, in the left image and the right image, a pixel which is included in a block having the sum of absolute differences (SAD) or a sum of squared differences (SSD) which is smaller than predetermined value may be a pixel having a similarity which is equal to or larger than a reference value, among entire pixels included in the left image and the right image.

The image matching unit 200 may calculate a coordinate and a depth of the plurality of feature points. Here, since it is known that the depth of each of the feature points is calculated based on a disparity between the left image and the right image, detailed description thereof will be omitted.

The image matching unit 200 may calibrate distortion between the left image and the right image.

The image matching unit 200 may correct distortion of an image which may occur when the left lens and the right lens of the stereo camera 100 are wide angle lenses.

The image matching unit 200 may correct pin cushion distortion which is formed in the left image and the right image.

The image matching unit 200 may correct barrel distortion which is formed in the left image and the right image.

The image matching unit 200 may correct radial distortion which is formed in the left image and the right image.

The image matching unit 200 may correct tangential distortion which is formed in the left image and the right image.

The image matching unit 200 may perform rectification on distortion in the left image and the right image.

The image matching unit 200 may intersect the left image and the right image to generate a stereoscopic image which matches a point on a scan line.

The image matching unit 200 sets a pixel which is common to the left image and the right image as a feature point and calculate a distance between the feature points.

The image matching unit 200 may calculate a depth of an edge which is a region of the left image and the right image where a brightness change which is equal to or larger than a predetermined value is generated. For example, since a plurality of pixels may be included in the edge, the image matching unit 200 may calculate depths of the feature points as a set with respect to the edge.

The image matching unit 200 may find a corresponding point from the left image and the right image to calculate a triangulation point.

The image matching unit 200 may calculate a spatial positional transformation of rearranged pixels of the left image and the right image which are sequentially input as time goes by.

The image matching unit 200 may calculate image rotation displacement of a pixel which is rearranged in the left image and the right image.

The image matching unit 200 may calculate an average image having an average information value (for example, a brightness, color, a depth) in the left image and the right image.

The image matching unit 200 may calculate information on an illumination component which represents a light and shade in the left image and the right image. In this case, the image matching unit 200 convolutes calculated information on the illumination component and information of an input image to calculate the average image.

The image matching unit 200 calculates information on a reflection component which represents a feature of an object in the vehicle front image using the average image.

The image matching unit 200 removes a pixel information value of the average image from pixel information values of the left image and the right image in accordance with a coordinate of each pixel included in the left image and the right image to calculate information on the reflection component.

The image matching unit 200 may compress calculated information on the reflection component.

The image matching unit 200 calculates information on the reflection component and scales the calculated information on the reflection component as a log.

The image matching unit 200 may perform stereo matching between the left image and the right image using a dynamic programming method. Further, the image matching unit 200 may perform stereo matching to generate a disparity map.

The image matching unit 200 may draw a triangle by connecting lines based on an efficient large-scale stereo (ELAS) matching method according to the exemplary embodiment to calculate a depth.

The image matching unit 200 may output the depth and the coordinate calculated for every feature point to the plane calculating unit 300 and the normal calculating unit 400.

The plane calculating unit 300 calculates a plane where the feature points are estimated to be present in the same space.

For example, the plane calculating unit 300 performs color segmentation on the vehicle front image to calculate a plane where the feature points are estimated to be present in the same space.

Alternatively, the plane calculating unit 300 connects every three feature points of the plurality of feature points based on the coordinate and the depth of the plurality of feature points to calculate a plurality of triangles. Here, the triangle refers to a triangular plane and vertexes of the triangle correspond to three different feature points.

For example, the plane calculating unit 300 may calculate a plurality of triangles from the plurality of feature points, using a Delaunay triangulation. Here, the Delaunay triangulation may refer a technique which, when points included in an arbitrary space are connected to form a plurality of triangles, does not include a point whose circumscribed circle is not included in the triangle.

The normal calculating unit 400 may calculate a direction (for example, a normal direction) to which the plurality of triangles calculated by the plane calculating unit 300 is directed. Specifically, the triangles calculated by the plane calculating unit 300 include three feature points and since the coordinate and the depth of the feature point have been calculated in advance by the image matching unit 200, the normal calculating unit 400 may calculate a normal direction of each triangle or the normal vector. In this case, the normal calculating unit 400 may calculate a direction of the normal which passes through a center of gravity of each triangle.

The normal calculating unit 400 may add two triangles which have similar normal among the plurality of triangles as one plane. For example, when a difference of the normal directions of two different triangles is within a predetermined angle, the normal calculating unit 400 determines that the two triangles are similar and adds the two triangles as one plane. In this case, when a difference between the normal direction of the added plane and the photographing direction of the stereo camera 100 is smaller than a predetermined angle, the normal calculating unit 400 may detect the plane obtained by adding two triangles as an obstacle. By doing this, a computation amount required for the obstacle detecting unit 500 to detect an obstacle, which will be described below, may be reduced.

As another example, when among the plurality of triangles, two triangles share one corner and a difference of the normal directions is within a predetermined angle, the normal calculating unit 400 may set the normal directions of the two triangles to have the same value. Specifically, when, among the plurality of triangles, the first triangle and the second triangle share one corner and a difference between a first direction which is a normal direction of a first triangle and a second direction which is a normal direction of a second triangle is smaller than a predetermined first threshold value, the normal calculating unit 400 may set the normal of the first triangle and the second triangle to have any one of the first direction, the second direction, and an intermediate direction of the first direction and the second direction.

The obstacle detecting unit 500 may detect an obstacle near the vehicle (for example, front), based on a result of comparing the photographing direction of the stereo camera 100 with the normal directions of the plurality of triangles.

Specifically, the normal calculating unit 400 may extract a triangle which faces the stereo camera 100, among the plurality of triangles. Here, the triangle which faces the stereo camera 100 may refer to a triangle which has a normal direction having a difference from the photographing direction of the stereo camera 100 which is smaller than the predetermined second threshold value, among the triangles calculated by the plane calculating unit 300.

The obstacle detecting unit 500 may detect an obstacle only with respect to at least one triangle which is included in a predetermined region of interest (ROI), among stereoscopic images generated by the image matching unit 200. For example, even though among the plurality of triangles, a difference between a normal direction of a third triangle located outside the region of interest ROI and the photographing direction of the stereo camera 100 is smaller than the predetermined second threshold value, the obstacle detecting unit 500 may not detect a third triangle as an obstacle.

In the meantime, when a difference between a normal direction of any one triangle among the plurality of triangles and the photographing direction of the stereo camera 100 is smaller than the predetermined second threshold value, the obstacle detecting unit 500 may not detect the triangle as an obstacle. For example, when the normal of an arbitrary triangle is directed to a direction perpendicular to the photographing direction of the stereo camera 100, the obstacle detecting unit 500 may determine that the triangle is not an obstacle but a road surface.

When the obstacle detecting unit 500 detects an obstacle in front of the vehicle, a warning unit 600 may output information on the detected obstacle or a warning message. The information on the detected obstacle may include information on at least one of a size of the obstacle, a position of the obstacle, and a distance from the vehicle to the obstacle. In this case, the warning unit 600 may output the warning message only when the distance to the detected obstacle is shorter than a predetermined reference distance. The warning message may be visually displayed on a display of the vehicle or audibly output through a speaker of the vehicle.

Figure 2:
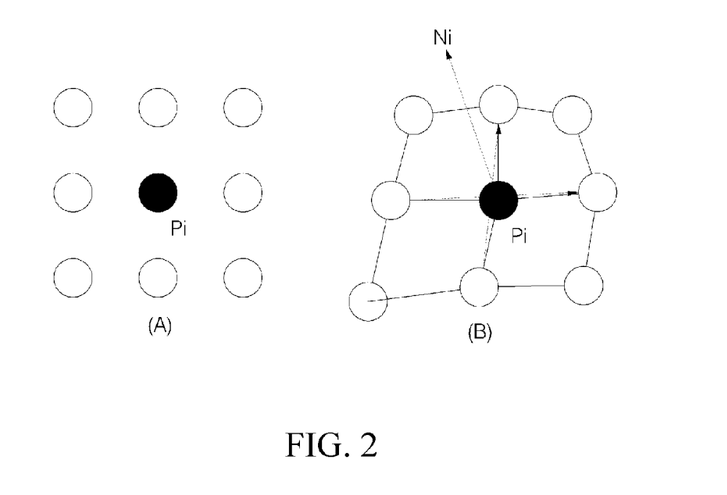
FIG. 2 illustrates a result of calculating a normal vector at an arbitrary point by a normal calculating unit according to an exemplary embodiment.

FIG. 2 illustrates a result of calculating a normal vector Ni at an arbitrary point by a normal calculating unit 400 according to an exemplary embodiment. FIG. 2A illustrates a pixel of a depth map and FIG. 2B illustrates three-dimensional point set data. The normal calculating unit 400 selects four points which are located up and down and left and right on a pixel with respect to a point Pi on the depth map and finds four points selected in FIG. 2A on the three-dimensional point set data of FIG. 2B to configure a vector between points located left and right on the pixel and a vector between points located up and down and then calculate an outer product between two vectors to calculate a normal.

Figure 3:
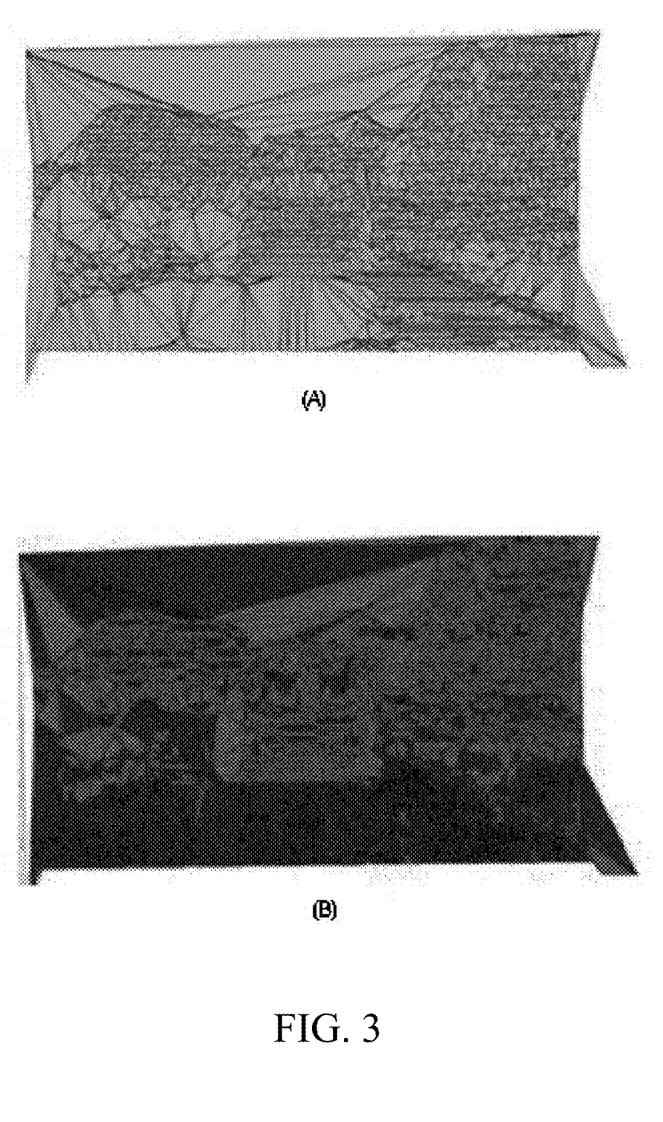
FIG. 3 illustrates an example which detects an obstacle from an image photographed using a stereo camera according to an exemplary embodiment of the present invention.

FIG. 3 illustrates an example which detects an obstacle from an image photographed using the stereo camera 100 according to an exemplary embodiment of the present invention. For the convenience of description, it is assumed that the plane calculating unit 300 calculates a plurality of feature points from a stereoscopic image generated by the image matching unit 200 and the normal calculating unit 400 connects a plurality of feature points to calculate a plurality of triangles.

First, FIG. 3A illustrates a result in which the plane calculating unit 300 connects every three feature points of the plurality of feature points extracted from the stereoscopic image generated by the image matching unit 200 to calculate the plurality of triangles. As illustrated in the drawing, some triangle may have a common corner with other triangle and a plurality of triangles may be sequentially connected. The normal calculating unit 400 may calculate normal direction for the plurality of triangles which is sequentially connected as illustrated in FIG. 3A.

Next, FIG. 3B illustrates a result in which the obstacle detecting unit 500 classifies the plurality of triangles illustrated in FIG. 3A depending on whether to have a difference from the photographing direction of the stereo camera 100 which is smaller than the predetermined second threshold value.

Specifically, the obstacle detecting unit 500 may classify a triangle which has a normal direction whose difference from the photographing direction of the stereo camera 100 is smaller than the predetermined second threshold value as an obstacle. Further, the obstacle detecting unit 500 may classify a triangle which has a normal direction whose difference from the photographing direction of the stereo camera 100 is equal to or larger than the predetermined second threshold value as a non-obstacle. A region represented with a gray color in FIG. 3B is a region where a triangle which is classified as an obstacle is located and a region represented with a black is a region where a triangle which is not classified as an obstacle is located.

Therefore, the obstacle detecting unit 500 detects an obstacle based on the normal direction of triangles with some pixels corresponding to the feature points as vertexes, rather than the entre pixel included in the stereoscopic image, so that the obstacle detecting speed may be significantly improved without losing a performance.

Figure 4:
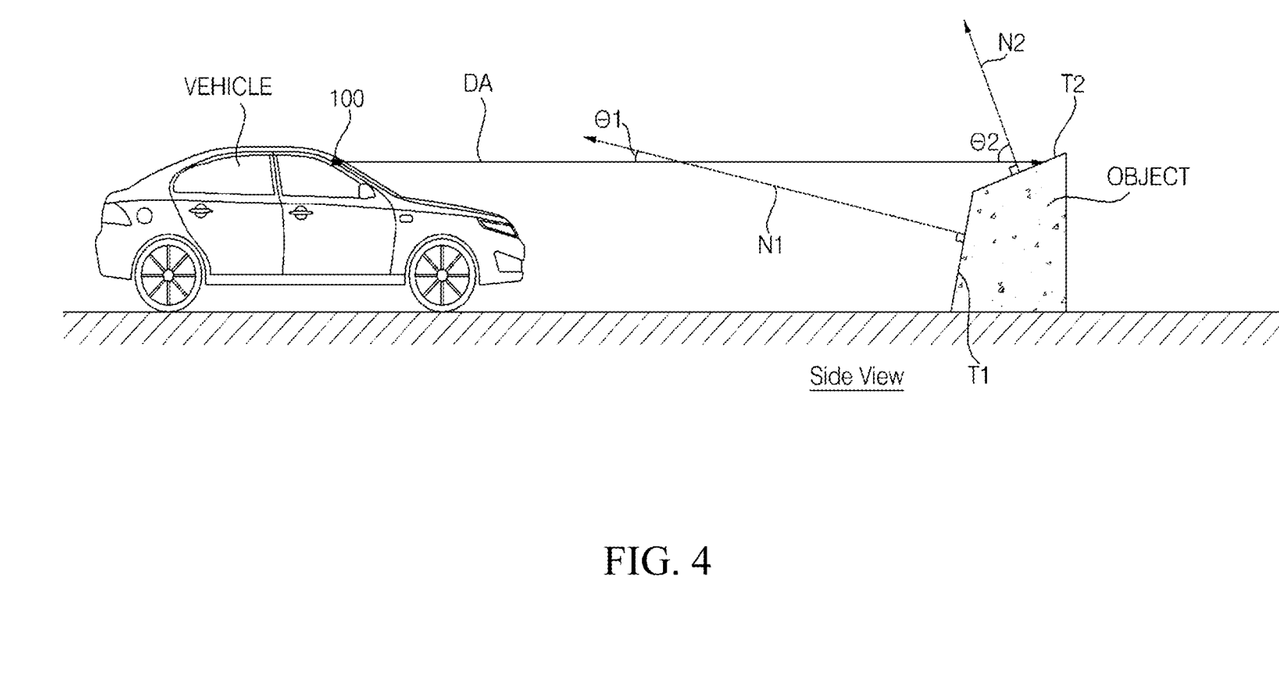
FIG. 4 illustrates an example of determining whether to be an obstacle based on a normal direction of a triangle according to an exemplary embodiment of the present invention.

FIG. 4 illustrates an example of determining whether to be an obstacle based on a normal direction of a triangle according to an exemplary embodiment of the present invention. For the convenience of description, description will be made with respect to a side view.

Referring to FIG. 4, the stereo camera 100 is provided in one position (for example, a wind shield) of a driving vehicle to photograph an object in front of the vehicle. In this case, it is assumed that the photographing direction of the stereo camera 100 is parallel to a ground, as illustrated in the drawing.

In this case, the object which is photographed may be calculated as a plurality of triangles by the plane calculating unit 300 and some of triangles may act as an obstacle with respect to the vehicle.

For example, as illustrated in the drawing, the plane calculating unit 300 may calculate a first triangle T1 and a second triangle T2 based on an image for the object. Further, the normal calculating unit 400 may a first normal N1 with respect to the first triangle T1 and a second normal N2 for the second triangle T2.

The obstacle detecting unit 500 may calculate a first direction difference $\theta 1$ which is a difference between the photographing direction $D_A$ of the stereo camera 100 parallel to the ground and a direction of the first normal N1. The obstacle detecting unit 500 may calculate a second direction difference $\theta 2$ which is a difference between the photographing direction $D_A$ of the stereo camera 100 parallel to the ground and a direction of the second normal N2.

When a relationship of the first direction difference θ1, the second direction difference θ2, and a second threshold value $θ_{Th}$ satisfies $θ1<θ_{Th}≤θ2$, the obstacle detecting unit 500 detects the first triangle T1 as an obstacle but does not detect the second triangle T2 as an obstacle.

Even though in FIG. 4, it is illustrated that a single object is present in front of the vehicle and two triangles are calculated for the object, it is only an example. When two or more objects may be present in front of the vehicle and three or more triangles are calculated for each object, the same object detecting method may be also applied.

Figure 5:
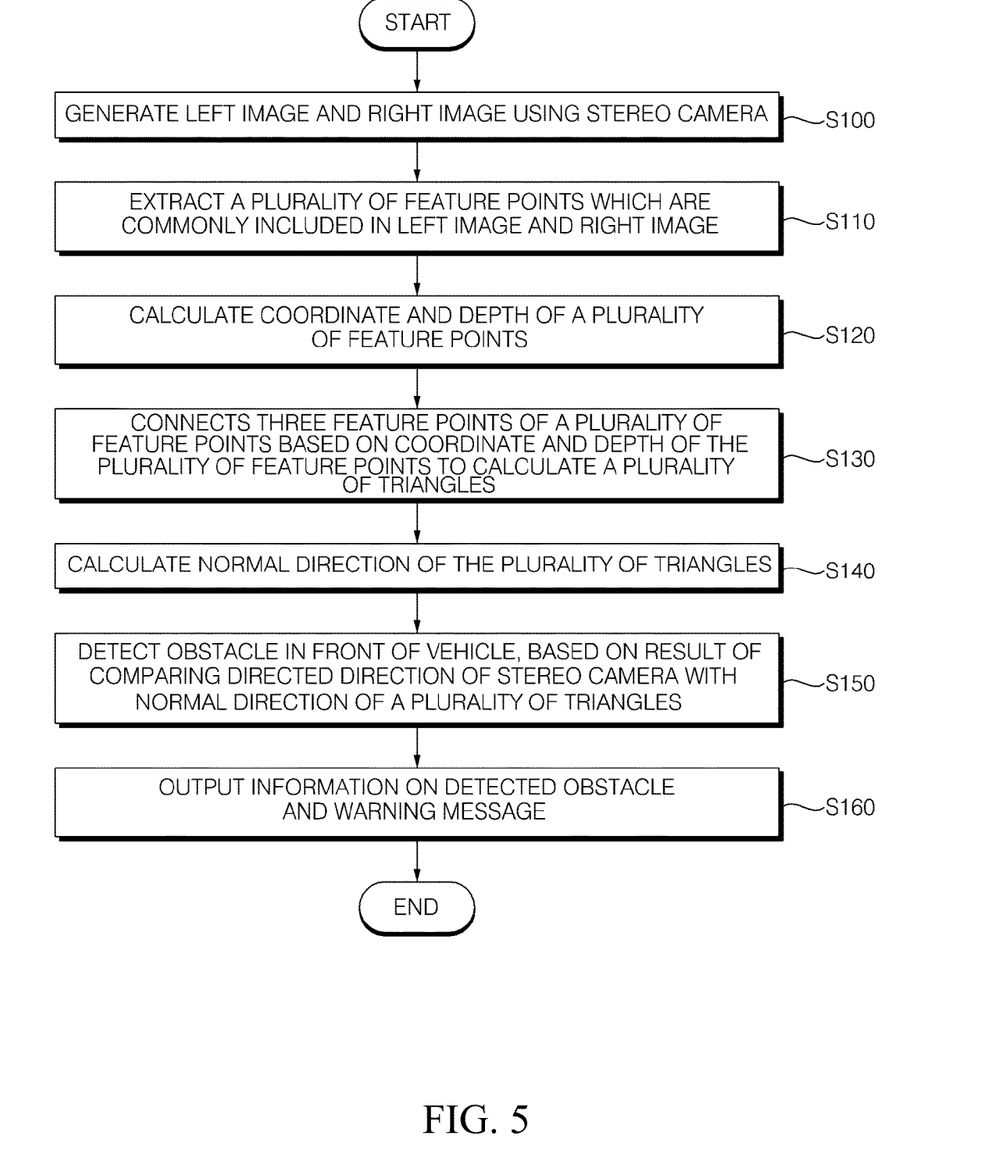
FIG. 5 is a flow chart of an obstacle detecting method according to an exemplary embodiment of the present invention.

FIG. 5 is a flow chart of an obstacle detecting method according to an exemplary embodiment of the present invention.

A stereo camera 100 according to an exemplary embodiment generates a left image and a right image in step S100. Specifically, the stereo camera 100 is mounted in one position in front of the vehicle to have a predetermined photographing direction and generates a left image using a left lens and a right image using a right lens. Further, the stereo camera 100 may output the left image and the right image to an image matching unit 200.

Next, an image matching unit 200 extracts a plurality of feature points commonly included in the left image and the right image in step S110. For example, the image matching unit 200 applies a block matching algorithm to extract a feature point which is a pixel which is commonly included in the left image and the right image and has a similarity which is larger than a reference value. Further, the image matching unit 200 may calculate a depth from an edge which is equal to or larger than a predetermined value in the images. Further, the image matching unit 200 calculates a region where a brightness change is equal to or larger than a predetermined value in the left image and the right image using edge detection and then applies the block matching algorithm to the region which is calculated that the brightness change is equal to or larger than the predetermined value to extract a plurality of feature points.

Next, the image matching unit 200 may calculate a coordinate and a depth of the plurality of extracted feature points in step S120. Here, the image matching unit 200 may calculate the depth of each of the feature points based on a disparity between the left image and the right image. Further, the image matching unit 200 may calculate a depth of the plurality of feature points as a set.

Next, the plane calculating unit 300 connects every three feature points of the plurality of feature points based on the coordinate and the depth of the plurality of feature points to calculate a plurality of triangles in step S130.

Next, a normal calculating unit 400 calculates normal directions of the plurality of triangles in step S140. Three vertexes of each triangle correspond to the extracted feature points and the coordinate and the depth of the feature points are already calculated, so that the normal calculating unit 400 may calculate the normal directions of the plurality of triangles.

The obstacle detecting unit 500 may detect an obstacle in front of the vehicle, based on a result of comparing the photographing direction of the stereo camera 100 with the normal directions of the plurality of triangles in step S150.

Next, an obstacle detecting unit 500 may classify a triangle which has a normal direction whose difference from the photographing direction of the stereo camera 100 is smaller than the predetermined second threshold value as an obstacle, among the plurality of triangles.

In this case, the obstacle detecting unit 500 may calculate information on at least one of a size of the detected obstacle, a position of the obstacle, and a distance from the vehicle to the obstacle. For example, the obstacle detecting unit 500 may calculate a size of the obstacle based on an area of the triangle classified as an obstacle, calculate a distance to the obstacle based on the depth of the feature point included in the triangle classified as an obstacle, and calculate a position of the obstacle based on the coordinate of the feature point included in the triangle classified as an obstacle.

The obstacle detecting unit 500 may classify a triangle which has a normal direction whose difference from the photographing direction of the stereo camera 100 is equal to or larger than the predetermined second threshold value as a non-obstacle, among the plurality of triangles. Further, the normal calculating unit 400 may receive depths of the feature points as a set which is output by the image matching unit 200. Further, the obstacle detecting unit 500 may detect an obstacle only with respect to triangles which are included in a predetermined region of interest (ROI), among stereoscopic images generated by the image matching unit 200. For example, even though among the plurality of triangles, a difference between a normal direction of a third triangle located outside the region of interest ROI and the photographing direction of the stereo camera 100 is smaller than the predetermined second threshold value, the obstacle detecting unit 500 may not detect a third triangle as an obstacle.

Next, when the obstacle detecting unit 500 detects an obstacle in front of the vehicle, a warning unit 600 may output information on the detected obstacle or a warning message in step S160. The information on the detected obstacle may include information on at least one of a size of the obstacle, a position of the obstacle, and a distance from the vehicle to the obstacle. In this case, the warning unit 600 may output the warning message only when the distance to the detected obstacle is shorter than a predetermined reference distance. The warning message may be visually displayed on a display of the vehicle or audibly output through a speaker of the vehicle.

Preferred embodiments of the present invention have been illustrated and described above, but the present invention is not limited to the above-described specific embodiments, it is obvious that various modification may be made by those skilled in the art, to which the present invention pertains without departing from the gist of the present invention, which is claimed in the claims, and such modification should not be individually understood from the technical spirit or prospect of the present invention.

What is claimed is:

1. An obstacle detecting apparatus, comprising:
   a stereo camera which photographs a front of a vehicle to generate a left image and a right image;
   an image matching unit which applies a block matching algorithm to the left image and the right image to extract a plurality of feature points having a similarity which is equal to or larger than a reference value and calculate a coordinate and a depth of the plurality of extracted feature points;
   a plane calculating unit which connects every three feature points of the plurality of feature points to calculate a plurality of triangles, based on the coordinate and the depth of the plurality of feature points;
   a normal calculating unit which calculates directions of normal of the plurality of triangles, based on the coordinate and the depth of three feature points corresponding to vertexes of the plurality of triangles; and an obstacle detecting unit which detects an obstacle in front of the vehicle based on a result of comparing a photographing direction of the stereo camera with the normal directions of the plurality of triangles.

2. The obstacle detecting apparatus of claim 1, wherein the image matching unit calculates a region where brightness change is equal to or larger than a predetermined value, in the left image and the right image, using the edge detection, and the block matching algorithm is applied to the region where the brightness change is equal to or larger than the predetermined value to extract the plurality of feature points.

3. The obstacle detecting apparatus of claim 1, wherein the plane calculating unit calculates the plurality of triangles using Delaunay triangulation.

4. The obstacle detecting apparatus of claim 1, wherein the normal calculating unit calculates a direction of a normal which passes through a center of gravity of the plurality of triangles.

5. The obstacle detecting apparatus of claim 1, wherein when a difference of directions of the normal of two triangles, which share one corner, among the plurality of triangles, is smaller than a predetermined first threshold value, the normal calculating unit sets normal directions of two triangles to have the same value.

6. The obstacle detecting apparatus of claim 5, wherein when a first triangle and a second triangle, among the plurality of triangles, share one corner and a difference between a first direction which is a normal direction of the first triangle and a second direction which is a normal direction of the second triangle is smaller than the predetermined first threshold value, the normal calculating unit sets the normal of the first triangle and the second triangle to have any one of the first direction, the second direction, and an intermediate direction of the first direction and the second direction.

7. The obstacle detecting apparatus of claim 1, wherein the obstacle detecting unit detects a triangle which has a normal direction which has a difference from the photographing direction of the stereo camera which is smaller than the predetermined second threshold value, as the obstacle, among the plurality of triangles.

8. The obstacle detecting apparatus of claim 1, wherein the obstacle detecting unit determines a triangle which has a normal direction which has a difference from the photographing direction of the stereo camera which is equal to or larger than the predetermined second threshold value, as a road surface, among the plurality of triangles.

9. The obstacle detecting apparatus of claim 1, further comprising:
a warning unit which outputs information on the obstacle or a warning message, when an obstacle in front of the vehicle is detected by the obstacle detecting unit.

10. An obstacle detecting method, comprising:
generating a left image and a right image with respect to a front of a vehicle, using a stereo camera;
extracting a plurality of feature points having a similarity which is equal to or larger than a reference value, by applying block matching algorithm to the left image and the right image;
calculating a coordinate and a depth of the plurality of extracted feature points;
connecting every three feature points of the plurality of feature points to calculate a plurality of triangles, based on the coordinate and the depth of the plurality of feature points;
calculating directions of normal of the plurality of triangles, based on the coordinate and the depth of three feature points corresponding to vertexes of the plurality of triangles; and
detecting an obstacle in front of the vehicle based on a result of comparing a photographing direction of the stereo camera with the normal directions of the plurality of triangles.

11. The obstacle detecting method of claim 10, wherein the extracting of a plurality of feature points includes:
calculating a region where brightness change is equal to or larger than a predetermined value, in the left image and the right image, using the edge detection; and
applying the block matching algorithm to the region where the brightness change is equal to or larger than the predetermined value to extract the plurality of feature points.

12. The obstacle detecting method of claim 10, wherein in the calculating of normal directions of the plurality of triangles, when a difference of directions of the normal of two triangles, which share one corner, among the plurality of triangles, is smaller than a predetermined first threshold value, normal directions of two triangles are set to have the same value.

13. The obstacle detecting method of claim 10, wherein in the detecting of an obstacle in front of the vehicle, a triangle which has a normal direction which has a difference from the photographing direction of the stereo camera which is smaller than the predetermined second threshold value is detected as an obstacle, among the plurality of triangles.

14. The obstacle detecting method of claim 10, further comprising:
outputting information on the obstacle or a warning message when an obstacle in front of the vehicle is detected.

15. The obstacle detecting method of claim 10, wherein in the detecting of an obstacle, a triangle which has a normal direction which has a difference from the photographing direction of the stereo camera which is equal to or larger than the predetermined value is detected as a road surface, among the plurality of triangles.

* * * * *